United States Patent
Palmer (10) Patent No.: US 8,264,177 B2
(45) Date of Patent: Sep. 11, 2012

(54) APPARATUS AND SYSTEM FOR EFFICIENTLY CONTROLLING A HUB MOTOR

(75) Inventor: Denis L. Palmer, Bixby, OK (US)

(73) Assignee: Millennial Research Corporation, Tulsa, OK (US)

( * ) Notice: Subject to any disclaimer, the term of this patent is extended or adjusted under 35 U.S.C. 154(b) by 523 days.

(21) Appl. No.: 12/436,716

(22) Filed: May 6, 2009

(65) Prior Publication Data

US 2009/0278481 A1    Nov. 12, 2009

Related U.S. Application Data

(60) Provisional application No. 61/050,979, filed on May 6, 2008.

(51) Int. Cl.
*H02P 5/00* (2006.01)

(52) U.S. Cl. ......... 318/400.01; 318/49; 318/83; 318/95; 310/134; 310/185

(58) Field of Classification Search ............ 310/44, 310/68 D, 133, 134, 156.55, 185, 208; 318/34, 318/41, 49, 50, 83, 93, 95, 98–100, 111–113
See application file for complete search history.

(56) References Cited

U.S. PATENT DOCUMENTS

| | | |
|---|---|---|
| 3,441,761 A | 4/1969 | Painton et al. |
| 3,679,953 A | 7/1972 | Bedford |
| 4,211,963 A | 7/1980 | Muller |
| 4,322,666 A | 3/1982 | Muller |
| 4,340,833 A | 7/1982 | Sudo et al. |
| 4,358,693 A | 11/1982 | Palmer et al. |
| 4,520,300 A | 5/1985 | Fradella |
| 4,634,958 A | 1/1987 | Cornwell |
| 4,883,981 A | 11/1989 | Gerfast |
| 5,227,702 A | 7/1993 | Nahirney |
| 5,514,923 A | 5/1996 | Gossler et al. |

(Continued)

FOREIGN PATENT DOCUMENTS

CN    87206678 U    6/1988

(Continued)

OTHER PUBLICATIONS

First Office Action in Application No. 200780035582.5 dated Aug. 5, 2010, 14 pages.

(Continued)

*Primary Examiner* — Derek Rosenau
(74) *Attorney, Agent, or Firm* — Fish & Richardson P.C.

(57) ABSTRACT

An apparatus, system, and method are disclosed for an efficient hub motor. A stator is attached to a shaft. Coils are embedded in the stator in a circular pattern. Two rotors are rotatably coupled to the shaft with the stator between them. Permanent magnets are embedded in each rotor. Each permanent magnet and each core has a similar cross-sectional shape. The permanent magnets are positioned in a circular pattern corresponding to the coils. The permanent magnets are positioned so that when a coil aligns with a permanent magnet a next coil aligns between two magnets. Shorting bars connect exterior edges of the permanent magnets. A sequence control connects each coil so that current flows in a coil in one direction and the sequence control disconnects the coil and reconnects the coil with current flowing in the opposite direction in response to a set of permanent magnets aligning with a coil.

13 Claims, 5 Drawing Sheets

U.S. PATENT DOCUMENTS

| | | | |
|---|---|---|---|
| 5,558,589 | A | 9/1996 | Schmidt |
| 5,744,895 | A | 4/1998 | Seguchi et al. |
| 5,783,894 | A | 7/1998 | Wither |
| 5,851,162 | A | 12/1998 | Tether |
| 5,949,613 | A | 9/1999 | Moir et al. |
| 5,955,807 | A | 9/1999 | Kajiura et al. |
| 6,011,339 | A | 1/2000 | Kawakami |
| 6,053,833 | A | 4/2000 | Masaki |
| 6,090,005 | A | 7/2000 | Schmidt et al. |
| 6,110,066 | A | 8/2000 | Nedungadi et al. |
| 6,155,364 | A | 12/2000 | Nagano et al. |
| 6,255,756 | B1 * | 7/2001 | Richter .................. 310/208 |
| 6,371,878 | B1 | 4/2002 | Bowen |
| 6,531,799 | B1 | 3/2003 | Miller |
| 6,545,444 | B2 | 4/2003 | Bedini |
| 6,555,944 | B1 | 4/2003 | York |
| 6,590,312 | B1 | 7/2003 | Seguchi et al. |
| 6,600,244 | B2 | 7/2003 | Okazaki et al. |
| 6,803,696 | B2 | 10/2004 | Chen |
| 6,833,646 | B2 | 12/2004 | Joong et al. |
| 6,841,916 | B2 | 1/2005 | Chiarenza |
| 6,948,461 | B1 | 9/2005 | Kotwicki |
| 7,109,671 | B2 | 9/2006 | Bedini |
| 7,126,309 | B1 * | 10/2006 | Takeuchi et al. .......... 318/811 |
| 7,187,098 | B2 | 3/2007 | Hasebe et al. |
| 7,202,620 | B2 | 4/2007 | Petersen |
| 7,719,147 | B2 | 5/2010 | Palmer et al. |
| 7,906,925 | B2 * | 3/2011 | Takeuchi ............. 318/400.38 |
| 2005/0012475 | A1 * | 1/2005 | Takeuchi .................. 318/34 |
| 2005/0045392 | A1 | 3/2005 | Maslov et al. |
| 2005/0179337 | A1 | 8/2005 | Hasebe et al. |
| 2006/0244320 | A1 * | 11/2006 | Guo et al. ................ 310/68 B |
| 2006/0279166 | A1 | 12/2006 | Takeuchi |
| 2006/0284507 | A1 | 12/2006 | Murakami |
| 2007/0052314 | A1 | 3/2007 | Hsu |
| 2007/0129198 | A1 | 6/2007 | Atarashi |
| 2008/0024044 | A1 | 1/2008 | Palmer et al. |
| 2008/0088200 | A1 * | 4/2008 | Ritchey .................. 310/268 |
| 2008/0119314 | A1 | 5/2008 | Usoro |
| 2009/0196574 | A1 | 8/2009 | Lidestri |
| 2009/0247341 | A1 | 10/2009 | Abe et al. |
| 2010/0085005 | A1 | 4/2010 | Palmer et al. |
| 2010/0187931 | A1 | 7/2010 | Palmer et al. |

FOREIGN PATENT DOCUMENTS

| | | |
|---|---|---|
| CN | 1073306 A | 6/1993 |
| EP | 1 870 990 A2 | 12/2007 |
| JP | 49149911 U | 12/1974 |
| JP | 54041406 Y2 | 12/1979 |
| JP | 59183180 A | 10/1984 |
| JP | 2000197386 A | 7/2000 |
| WO | WO 2007140624 A1 | 12/2007 |
| WO | WO2008/007510 * | 1/2008 |

OTHER PUBLICATIONS

International Preliminary Report on Patentability in Application No. PCT/US2009/054082 dated Oct. 21, 2010, 10 pages.

Electric Motor, Wikipedia, the free encyclopedia, http://en.wikipedia.org/wiki/Electric_motor, Jun. 24, 2008.

Continuously variable transmission, Wikipedia, the free encyclopedia, http://en.wikipedia.org/wiki/ Continously_variable_transmission, Jun. 24, 2008.

Power split, Wikipedia, the free encyclopedia, http://en.wikipedia.org/wiki/Transmission_%28mechanics%29#Infinately_variable.

2004 Toyota Prius Road Test, The Family Car Web Magazine, Nov. 11, 2008, http://www.familycar.com/roadtests/ToyotaPrius/.

The clean green car company, Toyota Prius Transmission, http://cleangreencar.co.nz/page/prius-transmission, Jun. 19, 2008.

Toyota Prius—Power Slip Device, http://www.eahart.com/prius/psd/, Jun. 16, 2008.

Transmission (mechanics), http://en.wikipedia.org/wiki/transmission_%28mechanics%29, Jun. 24, 2008.

Uncommon types, http://en.wikipedia.org/wiki/Transmission_(mechanics), Jun. 24, 2008.

Hanselman, D., "Brushless Permanent-Magnet Motor Design," McGraw-Hill, 1994, pp. 1-39, 61-101, 103-123, 125-153 and 155-181.

International Search Report in Application No. PCT/US2007/73165 dated Aug. 22, 2008, 2 pages.

International Search Report and Written Opinion in Application No. PCT/ US2009/054082 dated Aug. 17, 2009, 13 pages.

International Search Report and Written Opinion in Application No. PCT/ US2009/054049 dated Sep. 24, 2009, 13 pages.

International Search Report and Written Opinion in Application No. PCT/ US2009/043042 dated May 7, 2010, 13 pages.

Korean Intellectual Property Office, Office Action in Application No. 10-2009-7003965 dated Oct. 27, 2010, 7 pages.

Office Action in Application No. 2009-521885 dated Oct. 31, 2011, 4 pages.

International Preliminary Report on Patentability in Application No. PCT/US2009/054049 dated Feb. 9, 2012, 10 pages.

* cited by examiner

APPARATUS AND SYSTEM FOR EFFICIENTLY CONTROLLING A HUB MOTOR

CROSS-REFERENCES TO RELATED APPLICATIONS

This application claims priority to U.S. Provisional Patent Application No. 61/050,979 entitled "APPARATUS, SYSTEM, AND METHOD FOR EFFICIENTLY CONTROLLING A HUB MOTOR" and filed on May 6, 2008 for Denis L. Palmer, which is incorporated herein by reference.

BACKGROUND OF THE INVENTION

1. Field of the Invention

This invention relates to electric motors and more particularly relates to a direct current ("DC") hub motor.

2. Description of the Related Art

Electric vehicles offer hope for reduction of dependence on fossil fuels. However, electric vehicles have thus far been unpopular because of the limited range and the time required to recharge batteries. One of the major obstacles to increasing electrical vehicle performance is the efficiency of electric motors used to drive electric vehicles. While an electric motor may be smaller than a gas or diesel engine, large batteries are required that at least in part replace the weight of an engine.

A hub motor is a type of motor where the exterior of the motor rotates while the inner portion is fixed. A hub motor is advantageous because it can be attached to a wheel and can drive the wheel without an axel, drive shaft, transmission, or other components of a typical drive train. Elimination of a drive train greatly reduces the weight of a vehicle. While hub motors offers promise, typical hub motors suffer the same inefficiencies as typical electric motors. The inefficiencies are multiplied because two or more hub motors are required to power an electric vehicle. Typical hub motors are also heavy because they are made of metal. Typical hub motors also get hot due to eddy current losses and other inefficiencies.

What is needed is a new hub motor with increased efficiency that will overcome the problems associated with typical hub motors.

SUMMARY OF THE INVENTION

From the foregoing discussion, it should be apparent that a need exists for an apparatus, system, and method for an efficient hub motor. Beneficially, such an apparatus, system, and method would be lightweight and have minimal eddy current losses and other inefficiencies.

The present invention has been developed in response to the present state of the art, and in particular, in response to the problems and needs in the art that have not yet been fully solved by currently available motors. Accordingly, the present invention has been developed to provide a hub motor apparatus, system, and method that overcome many or all of the above-discussed shortcomings in the art.

The hub motor apparatus and system are provided with a plurality of elements. These elements, in the described embodiments include a direct current source, one or more stators, two or more coils, two or more rotors, two or more permanent magnets, a sequence control, two or more shorting bars, a thin conductive shield, and an energy recovery circuit.

The one or more stators, in one embodiment, are fixedly attached to a shaft. In a further embodiment, each stator is made of non-magnetic, non-conductive material. In another embodiment, the two or more coils are embedded in each stator.

In one embodiment, the two or more coils are embedded in a stator in a circular pattern. A row of coils, in another embodiment, are each positioned a same radius from the center of a stator, and each coil in the row is of a uniform size. Each coil, in one embodiment, has a non-conductive, non-magnetic core with a conductor wound around the core.

In a further embodiment, each coil is wound so that a conductor enters the coil at the exterior of the coil and exits at the exterior of the coil without the conductor passing the windings of the coil perpendicular to the windings. Each coil, in another embodiment, is constructed of two halves, and each half is wound so that the conductor starts at an interior of the coil and is wound with increasing radius so that the end of the conductor exits at the perimeter of the coil. Each half of the coil, in one embodiment, is joined so that the start of each conductor that is located at the interior of the winding are electrically connected together.

In one embodiment, the two or more rotors are rotatably coupled to the shaft so that the shaft defines an axis of rotation of the two or more rotors. Each stator, in another embodiment, is sandwiched between two rotors. The two or more rotors, in a further embodiment, comprise a non-magnetic material. In one embodiment, the two or more permanent magnets are embedded in each rotor. Two rotors, in a further embodiment, are spaced so that a length of each of the two or more permanent magnets measured parallel to the axis of rotation is at least as long as a distance between the two rotors.

The two or more permanent magnets, in one embodiment, each have a similar cross-sectional shape as a core. An end of each of the permanent magnets, in another embodiment, is positioned toward a stator. In a further embodiment, the permanent magnets are positioned in a circular pattern with a radius similar to the radius of the coils. In one embodiment, the permanent magnets are positioned so that when a coil aligns with a permanent magnet a next coil aligns between two magnets.

The cross-sectional shape of the two or more permanent magnets and the two or more coils, in one embodiment, is a pie shape. In one embodiment, the pie shape is oriented so that a narrow end of the pie shape is toward the axis of rotation. A line comprising a side of the pie shape, in a further embodiment, substantially intersects the axis of rotation. In another embodiment, the cross-sectional shape is substantially circular and the two or more permanent magnets are substantially cylindrical.

In one embodiment, the permanent magnets are positioned so that a distance between two adjacent permanent magnets in a rotor is about equal to a width of the cross-sectional shape of the two or more permanent magnets measured at a widest portion of the cross-sectional shape. A length of the two or more permanent magnets measured parallel to the axis of rotation, in one embodiment, is at least as long as a distance between two rotors. In a further embodiment, a length of the two or more permanent magnets measured parallel to the axis of rotation is longer than a distance between two permanent magnets in the two or more rotors.

The sequence control, in one embodiment, connects each coil so that current flows in a coil in one direction and the sequence control disconnects the coil and reconnects the coil with current flowing in the opposite direction in response to a set of permanent magnets aligning with a predefined position relative to the coil. In a further embodiment, the sequence control adjusts the predefined position relative to the coil in response to a speed of the two or more rotors. The sequence control, in another embodiment, turns on and shuts off individual coils in response to external demands on the hub motor.

In one embodiment, the two or more shorting bars are made of a conductive material. Each shorting bar, in a further embodiment, connects exterior edges that do not face a stator of two or more permanent magnets. In one embodiment, the thin conductive shield surrounds the core and the conductor is wound around the shield.

The energy recovery circuit, in one embodiment, is in electrical communication with the two or more coils. In a further embodiment, the energy recovery circuit recovers energy from a collapsing magnetic field in response to the sequence controller disconnecting a coil. The energy recovery circuit, in another embodiment, has two or more capacitors that each corresponds to a group of coils that are connected and disconnected simultaneously by the sequence control, each. In one embodiment, each capacitor stores the energy recovered from the corresponding group of coils.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
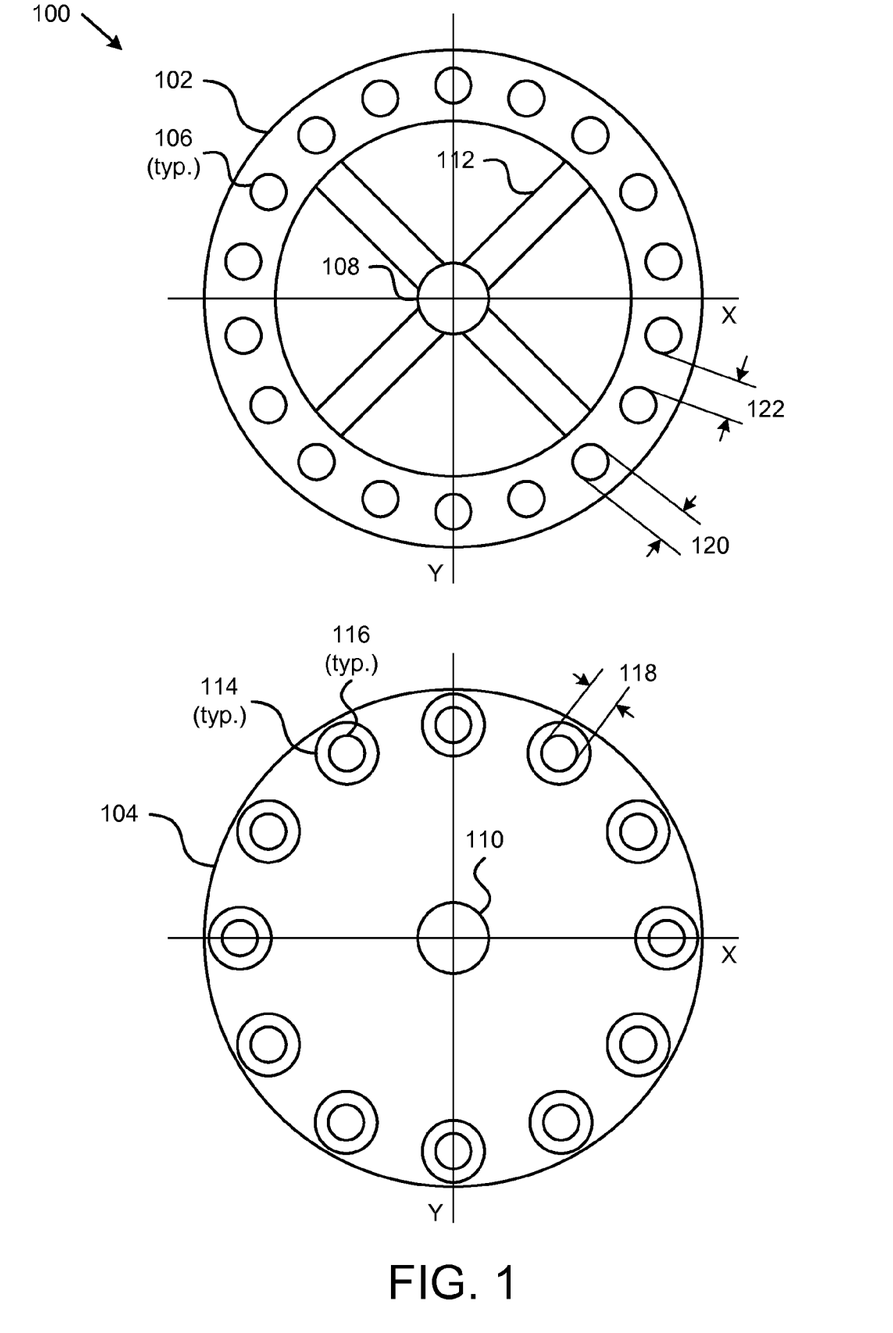
FIG. 1 is a side view of one side of a rotor and a stator illustrating one embodiment of a hub motor in accordance with the present invention.

FIG. 1 is a side view of one side of a rotor 102 and a stator 104 illustrating one embodiment of a hub motor 100 in accordance with the present invention. Depicted is one of two rotors 102. The stator 104 is sandwiched between the two rotors 102. In other embodiments, the hub motor 100 includes three or more rotors 102 with stators 104 positioned between each pair of rotors 104. The sequence of assembly of the hub motor would be rotor 1 102, stator 1 104, rotor 2 102, stator 2 104, rotor 3 102, etc. Typically, each hub motor 100 includes rotors 102 at each end.

The rotor 102 includes cylindrical permanent magnets 106 located around the perimeter of the rotor 102. The permanent magnets 106 are embedded in a non-magnetic material and connected to a bearing assembly 108 that fits over a shaft 110. In the depicted embodiment, the rotor 102 is connected to the bearing assembly 108 with spokes 112, but could also be attached with a solid member, slotted disc, or other means. The shaft 110 defines an axis of rotation for the rotor 102.

The stator 104 is connected to the shaft 110 such that the stator 104 does not move with respect to the shaft 110. The stator 104 includes coils 114 situated around the perimeter of the stator 104 such that when the stator 104 and rotor are connected using the shaft 110, the center of the coils 114 coincide with the permanent magnets 106. Each of the coils 114 is wrapped around a core 116. When the stator 104 and rotors 102 are assembled, the permanent magnets 106 are typically positioned so that the center of each permanent magnets 106 aligns with the centers of the coils 114 and the cores 116 as the permanent magnets 106 pass the coils 114. While other configurations are possible, aligning the permanent magnets 106 and coils 114 in this way increases efficiency of the hub motor 100.

Figure 5:
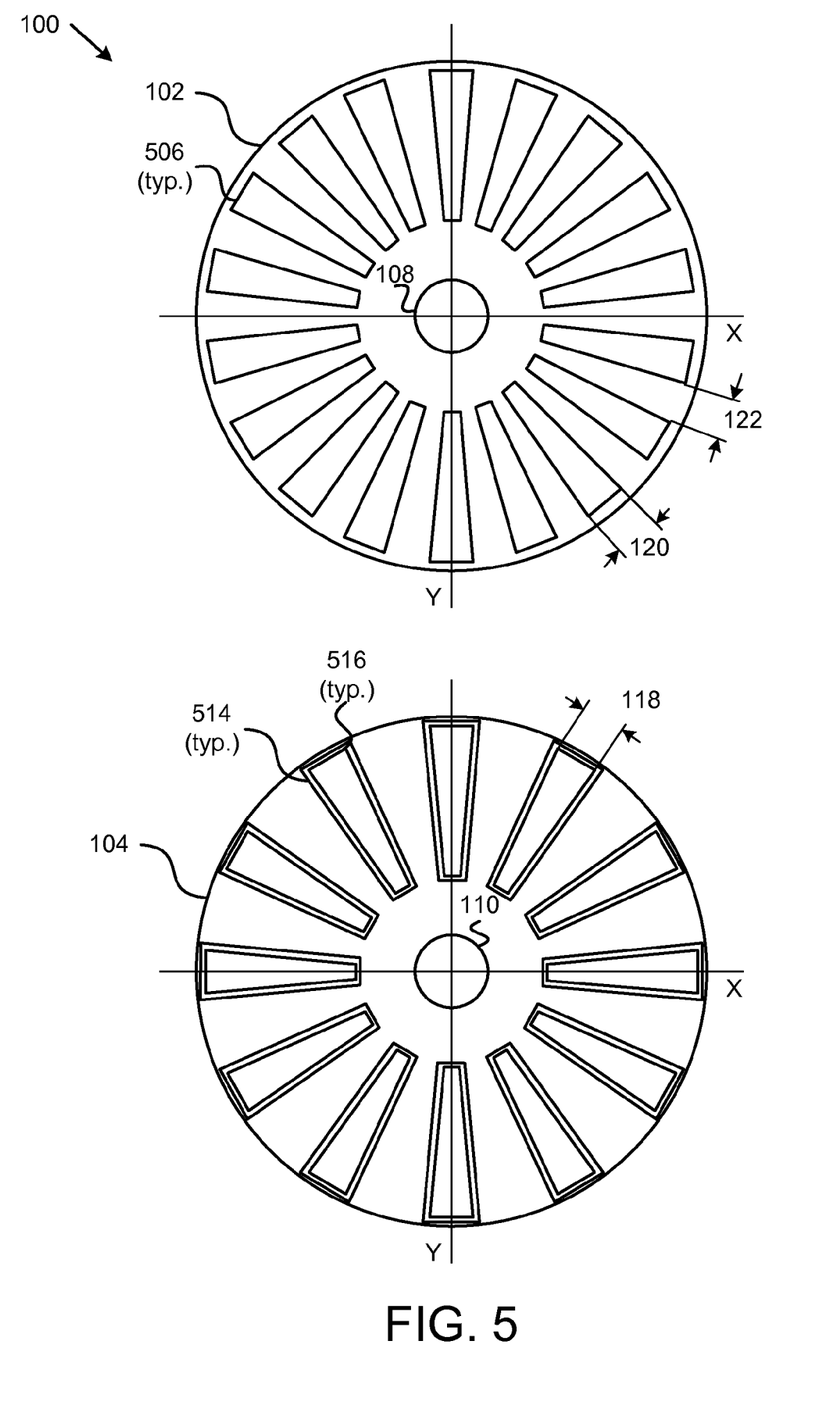
FIG. 5 is a side view of one side of a rotor and a stator illustrating another embodiment of a hub motor in accordance with the present invention.

In the depicted embodiment, the permanent magnets 106 and the cores 116 are both cylindrical, and have a similar shape and size. The cross-sectional shape of the permanent magnets 106 and the cores 116 as depicted in FIG. 1 is circular. FIG. 5 depicts another embodiment of the rotor 102 and the stator 104 that has permanent magnets and cores that are pie shaped. Permanent magnets and cores that have a pie shape or triangular shape are more efficient than cylindrical cores because a greater percentage of the force that is generated is directed around the axis of rotation of the rotor 102, increasing the rotational torque produced from the same input power. The cylindrical permanent magnets 106 and the cylindrical cores 116, however, may be simpler to manufacture and lower in cost than pie shaped magnets and cores, but are typically not as powerful or efficient as pie shaped magnets and cores. While cylindrical and pie shaped permanent magnets 106, and cores 116 are depicted, other shapes and configurations are also contemplated.

Figure 2:
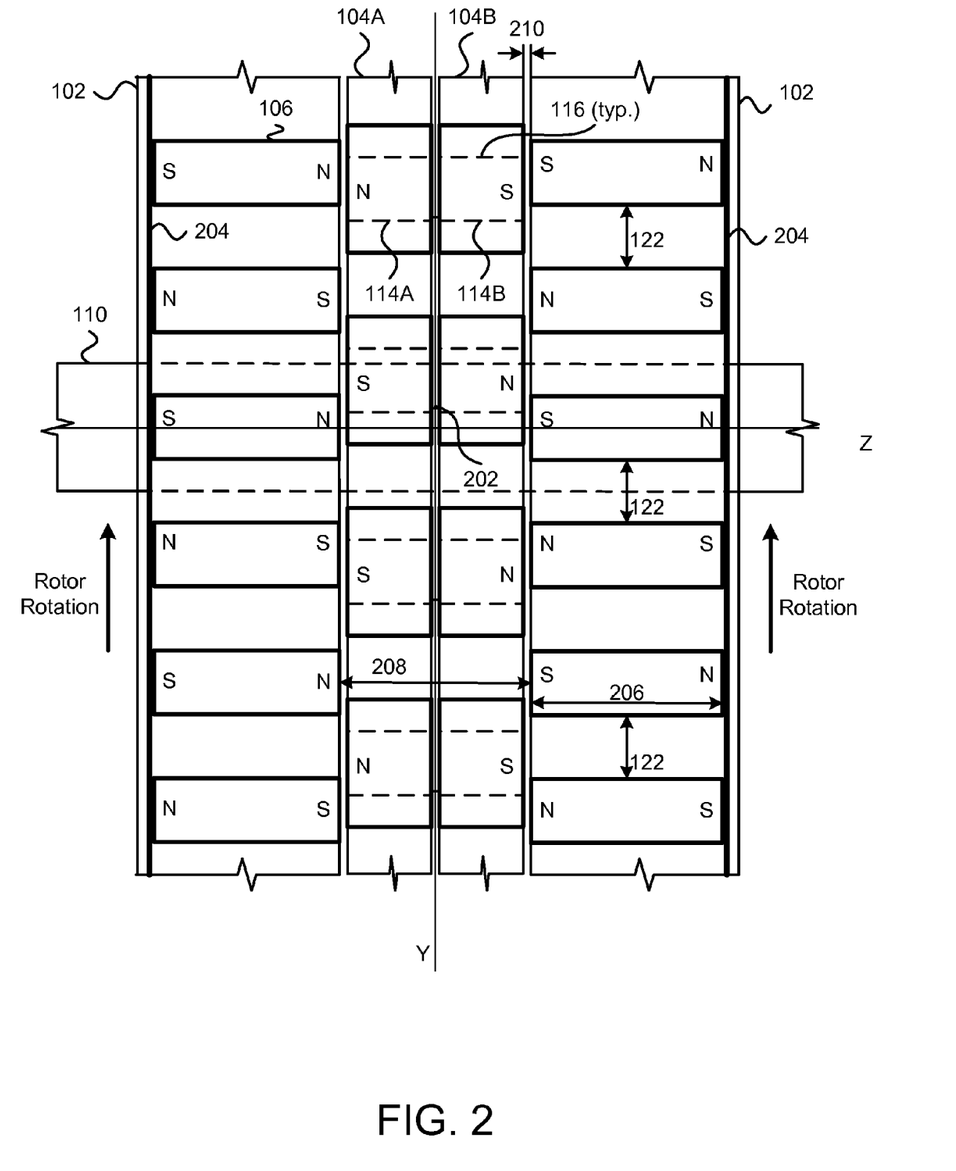
FIG. 2 is an end view illustrating the hub motor of FIG. 1 in accordance with the present invention.

FIG. 2 depicts an end view illustrating the hub motor of FIG. 1 in accordance with the present invention. FIG. 2 depicts two rotors 102 with a stator 104 sandwiched between the rotors 102. Note that the stator 104 is depicted in two parts 104A, 104B.

In a preferred embodiment, splitting the stator in two parts 104A, 104B allows the coils 114 to be constructed in two parts 114A, 114B. One half of a coil 114A is wound so that a wire starts in the center and is then wound like a bobbin with the wire existing on the outside perimeter of the coil 114A. The other half of the coil 114B is wound in a similar way such that the two wires in the center can be connected 202 when the two halves of the stator 104A, 104B are put together. The center wires may be connected 202 by soldering, using a connector, or any other means to make electrical contact between the wires. In another embodiment, a coil 114 is constructed as a one piece assembly with a wire placed in the center and then both halves 114A, 114B of the coil 114 are wound simultaneously.

By constructing a coil 114 in this way, the center wire need not exit along side the coil 114. Having a coil where the center wire exits along side the coil 114 causes a flux leak that reduces efficiency. Testing has shown that a coil 114 as depicted constructed so there is no wire running from the center along side the wires of the coil 114 results in about a 10% increase in motor torque for the same amount of power input. One of skill in the art will recognize other ways to wind a coil 114 so the wires to connect the coil 114 exit the coil 114 at the outside perimeter of the coil 114.

FIGS. 1 and 2 depict more permanent magnets 106 than coils 114. The coils 114 are intentionally spaced so that when one coil 114 is aligned with a pair of permanent magnets 106, the next coil 114 is between two other sets of permanent magnets 106. This arrangement is advantageous because when a coil 114 is aligned with a set of permanent magnets 106 such that little or no rotational torque is developed, the next coil 114 is positioned to generate rotational torque.

This concept can be seen by viewing the coils 114 and permanent magnets 106 in FIG. 2. A set of permanent magnets 106, for convenience of reference, includes two permanent magnets opposite each other. In the depicted embodiment, there are six sets of permanent magnets 106 shown running from the top of the page to the bottom. There are also four coils 114 running from top to bottom. (Of course the other coils 114, and magnets 106 of the stator 104 and rotors 102 are included but are outside of the view shown in FIG. 2). The shaft 110 is shown running through the stator/rotor assembly 102, 104 along the Z-axis.

In the depicted example, each set of magnets 106 is paired with another set of adjacent magnets 106 and connected with a shorting bar 204. The shorting bar 204 is constructed of a conductive material. The magnets 106 are arranged by polarity so that one set of magnets 106 has a north-south field across the stator 104 while the next set has an opposite south-north field across the stator 104. Two sets of magnets 106 connected with shorting bars 204 form a magnetic loop where flux is tightly contained in the magnets 106, shorting bars 204 and across the gap between the two rotors 102 through the stator 104. Any two sets of adjacent magnets 106 form a magnetic loop.

Spacing of the magnets 106 with respect to the width 120 of the magnets 106 is critical in terms of directing magnetic flux efficiently and creating a matrix of magnets 106 and resulting flux that is even. The width 120 of the magnets 106 is measured at the widest portion of the cross-sectional shape of the magnet 106 in the direction of rotation. In the depicted embodiment, the spacing 122 between magnets 106 is equal to the width 120 of a magnet 106, which is the diameter of the magnet 106. This creates a matrix that is ladder-type for a configuration of two rotors 102 and one stator 104. If the spacing 122 between magnets 106 is less, current limiting in the coil 114 is reduced. If the spacing 122 between magnets 106 is increased, motor torque is reduced. Experimentation has shown that a spacing 122 of about one diameter 120 of a magnet 106 is optimal.

In addition, the length 206 of the magnets 106 is typically at least as long as the spacing 122 between magnets 106. The length 206 is measured parallel to the axis of rotation Z. Shortening the length 206 of the magnets 106 beyond about a point where the length 206 equals the width 120 allows flux of a magnet to go from one end of the magnet 106 to the other end of the magnet 106 rather than traveling through the shorting bars 204 and forming a magnetic loop. Using a non-magnetic material in the rotor 102 between magnets 106 also helps to direct flux around the magnetic loop rather than going from one end of a magnet 106 to the other.

Like current, magnetic flux travels a path of least resistance. In the depicted embodiment, magnetic flux created by this pattern of magnets 106 forms a very evenly distributed matrix with flux substantially contained by the magnets 106 and through the stator 104 between the magnets 106. By constructing the stator 104 and rotor 102 of non-magnetic, non-conductive material for portions in the area of interest, other than the coils 114, magnets 106, and shorting bars 204, the hub motor 100 can be made to be efficient because the magnetic fields are not causing significant losses through eddy currents in the motor housing. The hub motor 100 is efficient so it does not generate a significant amount of heat so conductive housings are not required for heat transfer.

Spacing 208 between magnets 106 is also chosen for efficiency. If the magnets 106 are too far apart, the path of least resistance for the magnets 106 is from one magnet 106 to an adjacent magnet 106 rather than across the gap between rotors 102. Experimentation has shown that an efficient distance 208 between magnets 122 on either side of the stator 104 is shorter than the length 206 of the magnets 106. For 1 inch long magnets, a preferable spacing 208 is 1 inch or shorter. A spacing 208 of more than about 2 times the length 206 of the magnet 106 begins to degrade efficiency very quickly.

If the magnets 106 are spaced much further apart, a significant amount of flux will go from one magnet 106 to the adjacent magnet 106 instead of to the opposing magnet 106. If the spacing 208 is much, much less, the coils 114 must become very narrow and the interaction between the coils 114 and magnets 106 will be less efficient. The length 206 of the magnet 106 and the spacing 208, or length of the coil 114 and the gap 210, are measured parallel to the Z axis, which is the axis of rotation of the rotor 102.

By sizing the spacing 208 less than the length 206 of the permanent magnets 106, many inefficiencies in the hub motor 100 are eliminated or reduced. For example, metal shielding around the cores 116 that is used to focus the magnetic field can be eliminated when the spacing 208 is shorter than the length 206 of the permanent magnets 106. Because the shielding is magnetic material, eddy currents are created which decrease efficiency. Elimination of the shielding decreases losses. Positioning the rotors 102 such that the spacing 208 is less than the length 206 of the permanent magnets 106 allows the shielding to be eliminated and eliminates losses in the shielding and other inefficiencies.

In the embodiment depicted in FIG. 2, the first coil 114 (top) has current flowing such that a magnetic field is set up through the core 116 where north is to the left and south is to the right. The first set of magnets 106 (top) are set up so the north of the magnet 106 on the left side is next to the coil 114. The opposite magnet 106 on the left of the coil 114 has a south pole that is facing the coil 114. The polarity of the next set of magnets 106 (the two magnets just below the top set) is opposite the top set of magnets 106. The first coil 114 will be repelled from the first set of magnets 106 and attracted to the second set of magnets 106.

The second coil 114 from the top has current flowing in an opposite direction so the magnetic field created has a north to the right and south to the left. This will cause the second set of magnets 106 to be repelled and the third set to be attracted. This pattern continues for the remaining coils 114 and magnets. The magnetic forces created cause the rotors 102 to rotate as shown.

When the rotor 102 rotates so the first coil 114 is centered between the second set of magnets 106, it will no longer generate rotational torque because moving the rotor 102 in either direction causes magnetic forces to move the magnets 106 back to the center. For the depicted example, the spacing of the coils 114 and magnets 106 is such that every other coil 114 will reach a center of a set of magnets 106 at the same time and the intervening coils 114 will be directly between two sets of magnets 106. At this point, for efficient motor operation, current is reversed in the coils 114 that are centered between magnets 106. This reverses the north and south poles of the generated magnetic field such that the coils 114 centered between magnets repel those magnets 106 and are attracted to the next set of magnets 106 in the rotation. This sequence continues and the coils 114 that were between magnets 106 previously eventually reach a position where they are centered between a set of magnets and the current in those coils 114 is reversed.

The air gap 210 between stator 104 and rotor 102 is also chosen for efficiency. The air gap is preferably about 1/10 of an inch or less. Larger air gaps reduce efficiency and smaller air gaps are more difficult to maintain, but if achieved, can increase efficiency.

Because of these factors discussed above, for optimum efficiency, the length 206 of the permanent magnets 106, the spacing 208 between sets of permanent magnets 106 in two opposite rotors 102, the width 120 of the permanent magnets 106, and the spacing 122 between adjacent permanent magnets 106 are specifically chosen to improve efficiency. In one embodiment, these lengths have the following relationships:

Length 206>Spacing 208

Length 206>Spacing 122

Width 120=Spacing 122

In another embodiment, although there will still be some losses and inefficiencies compared to the more optimal relationships listed above, each of the length 206 of the permanent magnets 106, the spacing 208 between sets of permanent magnets 106 in two opposite rotors 102, the width 120 of the permanent magnets 106, and the spacing 122 between adjacent permanent magnets 106 may be substantially similar. Increasing the spacing 208 or the spacing 122 beyond the length 206 of the permanent magnets 106, however, typically greatly increases inefficiencies and losses.

Figure 3:
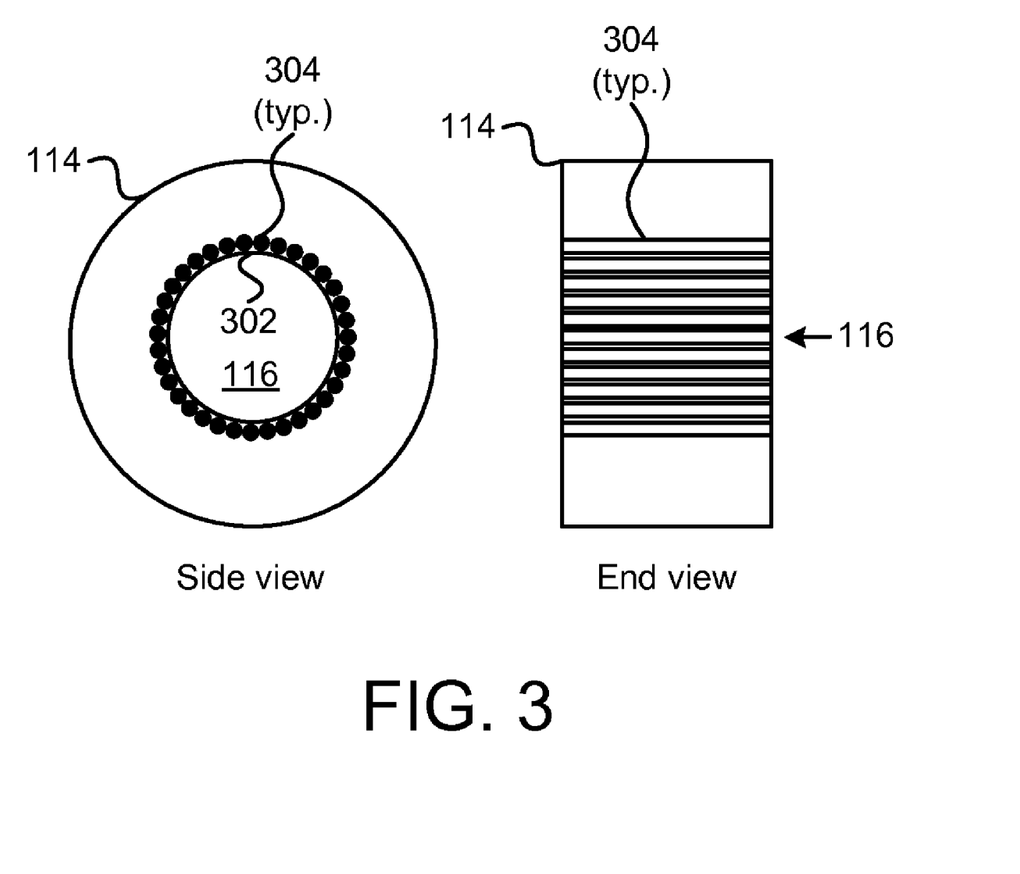
FIG. 3 is a depiction of one embodiment of a coil for the hub motor in accordance with the present invention.

FIG. 3 illustrates one embodiment of a coil 114. Each coil 114 includes a core 116. In the depicted embodiment, the center of each core 116 is an air core surrounded by a conductive path around the circumference of the core 116. In one embodiment, as depicted the core 116 is a hollow tube 302, preferably of a non-conductive material, surrounded by conductors 304 that run the width of the coil 114. In the depicted embodiment, the conductors 304 are spaced around the hollow tube 302 and are not touching each other. In another embodiment, the conductors 304 are coated with an insulating material and can touch. In another embodiment, the conductors 304 touch each other and are not coated with an insulator. In another embodiment, the conductors 304 are piano wire. By having parallel conductors 304, a magnetic field formed in the core 116 will cause flux lines to fill the center of the core 116 and will be contained by the conductors 304 with very little eddy current loss or other loss.

In another embodiment, the core 116 and the coil 114 are shaped and positioned relative to the permanent magnets 106 such that losses are minimized without the use of parallel conductors 304, so that there are also no eddy current losses due to the use of the conductors 304. For example, using permanent magnets 106 that are at least as long as the coil 114 in certain embodiments may remove the need for the conductors 304, and use of the conductors 304 in such a configuration may decrease efficiency, as described above with regard to the spacing 208 of FIG. 2.

The core 116 may be formed using a pipe of conductive material. In this embodiment, the conductors 304 are typically not present. The pipe is typically thin to reduce eddy current losses. Using a pipe is typically more lossy than a tube 302 surrounded by conductors 304, but may be less labor intensive or less expensive than a hollow tube 302 surrounded by conductors 304.

In one embodiment, the diameter 118 (see FIG. 1) or shape of the conductors 304 or pipe is chosen to match the diameter 120 or shape of the permanent magnets 106. This creates a flux pathway between the permanent magnets 106 where the flux travels more or less straight between the magnets 106. Rather than saturating an iron core, as in a traditional motor, and using the core as a permanent magnet to attract some magnetic material, the non-magnetic core 116 of the coils 114 of the present invention are used to focus magnetic fields. The small amount of conductive material around the core, a pipe, conductors 304, or the like, typically saturate easily. This conductive material surrounding the core 116 acts as a magnetic shield that will not easily allow magnetic flux lines to cross through the shield. The magnetic flux lines then travel through the core 116.

Strong magnets 106 create a saturated or near saturated magnetic field through a core 116 when a coil 114 coincides with a set of magnets 106. This causes a current limiting effect that keeps the current in the coils 114 at a minimum. As the rotor 102 rotates, the magnetic field created by the coil is altered by the magnetic flux between magnets 106. When a coil 114 is not directly aligned with a set of magnets 106, current in the coil 114 may increase. The faster the rotors 102 rotate, the more current is allowed. The slower the rotors 102 rotate, the more the saturated magnetic field affect current in the coils 114 so the lower the current.

The hub motor 100 has the desirable feature of a very low locked rotor current while maintaining a high amount of torque due to this current limiting effect. This feature significantly increases efficiency of the motor at slow speeds, and is not present in traditional motors.

As the hub motor 100 rotates, each time a coil 114 passes a set of magnets 106 and the current is reversed, the magnetic field collapses. Energy stored in the field in a typical motor is lost as heat. In the present invention, an energy recovery circuit is used to capture energy from a collapsing magnetic field.

Figure 4:
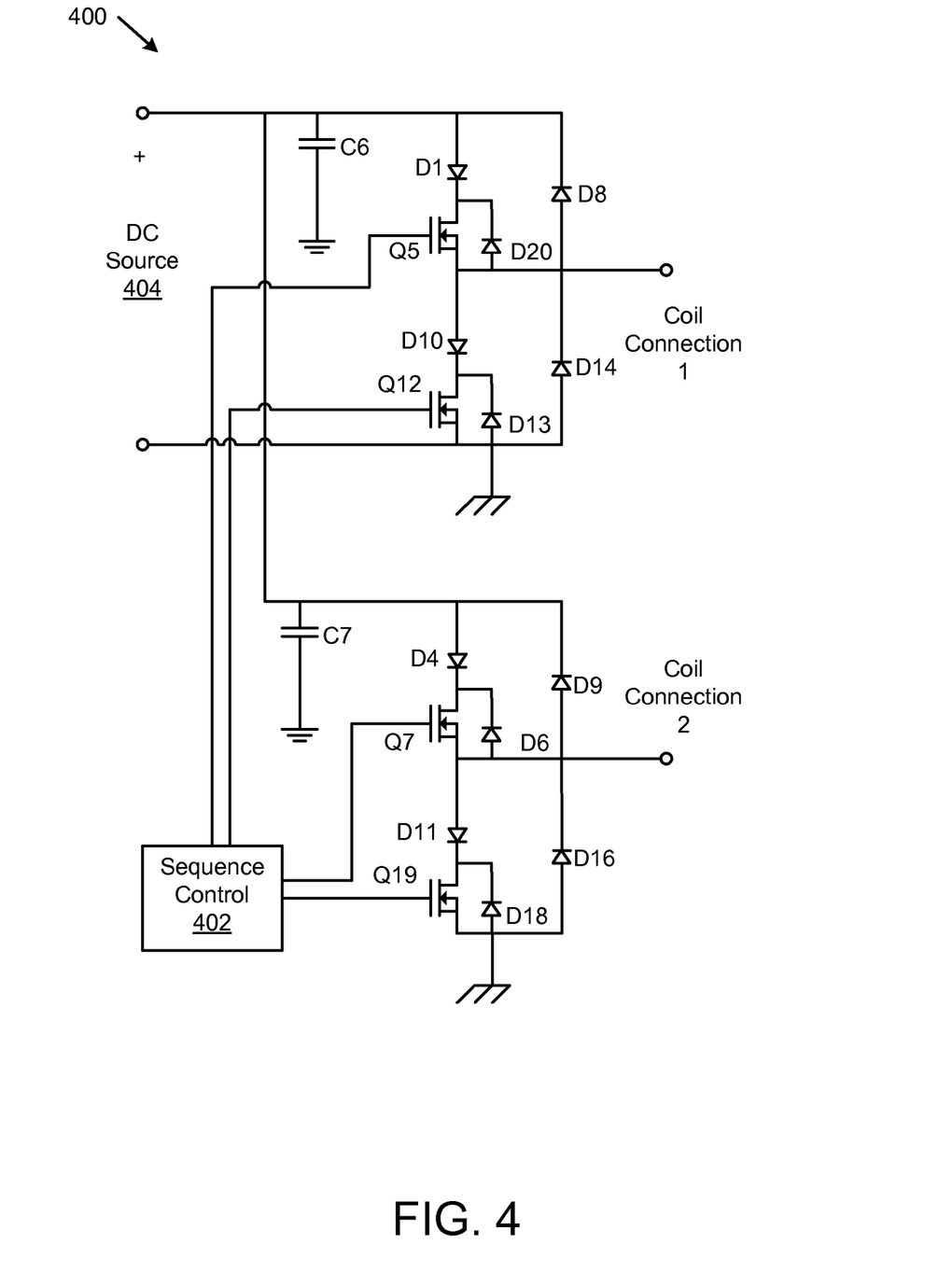
FIG. 4 is a depiction of one embodiment of an energy recovery circuit in accordance with the present invention.

FIG. 4 is a depiction of one embodiment of an energy recovery circuit 400 in accordance with the present invention. The sequence control 402 drives switches Q5, Q7, Q12 and Q19. When a coil 114 is in a position so it is ready to be connected, switches Q5 and Q19 close. This allows current from the electrical direct current ("DC") source 404 to flow through Q5 to the coil 114 and return from the coil 114 through Q19 to ground. When the motor 100 rotates to the point where the coil is to be disconnected, switches Q5 and Q19 open. While the generated magnetic field in the coil 114 collapses, current continues to flow through the coil 114. The current flows through diodes D14 and D9 and charge up capacitor C7. Capacitor C7 is charged to a voltage higher than the DC source.

When the coil 114 is again connected, polarity is reversed so Q7 and Q12 are closed. This allows capacitor C7 to discharge through Q7 and Q12 to start current flowing in a direction opposite of the current flowing when Q5 and Q19 were closed. When the capacitor C7 discharges to the DC source voltage, the DC source 404 begins to supply current. When the coil reaches the next set of magnets 106, Q7 and Q12 open. Current again continues to flow through the coil, which charges up capacitor C6.

This circuit 400 allows energy from a collapsing magnetic field, that would normally be lost as heat, to be recovered in capacitors C6 and C7 and then returned when the current is reversed in the coil 114. Testing has shown that when the hub motor 100 is moving slowly and current from the DC source 404 is about 0.2 amperes ("A"), current flowing through the coil may be about 6 A. The energy recovery circuit 400 typically increases motor efficiently significantly.

The sequence control 402 may also be used beneficially to increase motor efficiency by adjusting the timing of when each coil 114 is connected as a function of motor speed. As the speed of the motor 100 increases, generation of magnetic fields in the coils 114 is affected. The sequence control 402 uses some predefined angle or position relative to the coil to determine the timing, and may adjust the predefined position in response to a rotational speed of the rotors 102. By altering the timing of when coils 114 are connected as a function of speed, motor efficiency is increased. Typically, as motor speed increases, the timing is advanced so that current a coil 114 is reversed sooner than if the motor 100 is running slowly. This timing advance is very similar to changing the timing of a gasoline or diesel engine.

In one embodiment, timing is adjusted in two or more steps. For example, up to a certain speed, the timing is such that the current reversal in a coil 114 occurs at top dead center (i.e. when a coil aligns with a set of magnets) or at some angle before or after top dead center. When the motor speed reaches a certain level, the timing is advanced so that the current of a coil 114 is reversed ahead of reaching top dead center.

In another embodiment, the timing is adjusted continuously or substantially continuously as the motor speed increases. This variable timing may be advantageous from an efficiency perspective. One of skill in the art will recognize other ways that the timing can be advanced to increase motor efficiency.

FIG. 5 is a side view of one side of the rotor 102 and the stator 104 illustrating another embodiment of the hub motor 100 in accordance with the present invention. In the embodiment depicted in FIG. 5, the hub motor 100 has substantially pie shaped permanent magnets 506, coils 514, and cores 516, in place of the cylindrical permanent magnets 106, coils 114, and cores 116 of FIG. 1. The cross-sectional shape of the permanent magnets 506 and the cores 516 is substantially pie shaped.

The permanent magnets 506 and the cores 516 are oriented so that the narrow end of each pie shape is toward the shaft 110 and the axis of rotation of the rotor 102, and a line drawn along each side along the length of the pie shapes substantially intersects the axis of rotation. In the depicted embodiment, each pie shape is truncated to allow for room around the shaft 110 and the bearing assembly 108 and coils around a core 516. In other embodiments, the general pie shapes may have rounded edges or rounded sides, may be more triangular or rectangular, or may otherwise vary from the depicted pie shapes based on design considerations.

Because the permanent magnets 506 and cores 514 are pie shaped, they are more efficient than the cylindrical permanent magnets 106 and cores 114 of FIG. 1, because a greater percentage of the force that is generated by the cores 514 and permanent magnets 506 is directed around the axis of rotation of the rotor 102. By directing more produced power in the direction of rotation, the pie shaped permanent magnets 506, coils 514, and cores 516 greatly increase the rotational torque produced using the same input power.

This increase can be used to provide greater speeds, greater force, and longer running times while using the same or lower input energy as less efficient traditional motors. Using pie shaped permanent magnets 506 and cores 514 can also increase the area of the permanent magnets 506 and the cores 514 over cylindrical magnets and cores, further increasing the power output of the hub motor 100. In the depicted embodiment, the width 118 of the pie shaped cores and the width 120 of the permanent magnets are measured at the widest point. In another embodiment, the widths 118, 120 may be an average width of the pie shape.

Another significant advantage of the hub motor 100 is that the coils 114 are not custom wound on the stator 104, but instead are wound separately from the stator 104 and are uniform. This is desirable because each coil 114 can be machine wound instead of wound by a semi-skilled laborer. This greatly reduces cost. In addition, because the coils 114 are a standard, uniform size, they are modular and a coil 114 can fit in any stator 104 opening for a coil 114.

Another advantage of the hub motor 100 is that not all coils 114 are required for operation. For example, if a coil starts to fail, it can be shut off and flagged for replacement. The motor 100 will continue to operate with a slightly lower power output. In another example, the sequence control 402 can shut off or turn on certain individual coils 114 to conserve energy or to increase power based on external demands on the hub motor 100. If a high torque is required, such as in a vehicle when accelerating from a stop, all of the coils 114 can be turned on to provide maximum power. Once the vehicle is up to speed and less power is required, some of the coils 114 can be shut off to conserve energy.

The hub motor 100 can also be customized based on speed and power requirements. For example, two or more rings of magnets 106 can be built onto one rotor 102. The stator 104 would then have more coils 114 with one ring of coils 114 corresponding to each ring of magnets 106. The magnets 106 and coils 114 can also be spaced further apart. This would typically reduce power output but may increase motor speed. As mentioned above, the number of rotors 102 and stators 104 can also be increased.

The hub motor 100 is also very flexible and can be used in various applications. For example, the hub motor 100 can be used as a stepper motor with very little current being drawn at low speed or in a fixed position.

The hub motor 100 advantageously is very efficient with respect to current motors now available. The hub motor 100 offers an increase in efficiency at a lighter weight and lower heat output that opens the door to many uses previously unavailable. For example, by using the hub motor 100 in a vehicle, the drive train of the vehicle is eliminated, thus reducing weight. The hub motor 100 is also lighter than current hub motors. The hub motor 100 also produces more torque than current hub motors. The combined advantages of the hub motor 100 reduce energy requirements so a vehicle could conceivably travel much farther on a single charge than current electric vehicles.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An efficient hub motor, the hub motor comprising:
   one or more stators fixedly attached to a shaft, each stator comprising a non-magnetic, non-conductive material;
   two or more coils embedded in each stator in a circular pattern, wherein a row of coils are each positioned a same radius from the center of a stator, wherein each coil in the row is of a uniform size with a non-conductive, non-magnetic core wherein a conductor is wound around the core;
   two or more rotors rotatably coupled to the shaft such that the shaft defines an axis of rotation of the two or more rotors, wherein each stator is sandwiched between two rotors;
   two or more permanent magnets embedded in each rotor, each permanent magnet having a similar cross-sectional shape as a core with an end of each of the permanent magnets positioned toward a stator, the permanent magnets positioned in a circular pattern with a radius substantially similar to the radius of the coils, the permanent magnets positioned such that when a coil aligns with a permanent magnet a next coil aligns between two magnets;
   two or more shorting bars comprising a conductive material, each shorting bar connecting an exterior edge of two or more permanent magnets, the exterior edge not facing a stator; and
   a sequence control that connects each coil such that current flows in a coil in one direction and the sequence control disconnects the coil and reconnects the coil with current flowing in the opposite direction in response to a set of permanent magnets aligning with a predefined position relative to the coil;
   wherein a length of the two or more permanent magnets measured parallel to the axis of rotation is longer than a distance between two adjacent permanent magnets in the two or more rotors or is at least as long as a distance between two rotors.

2. The hub motor of claim 1, wherein the cross-sectional shape of the two or more permanent magnets and the two or more coils comprises a pie shape, the pie shape oriented such that a narrow end of the pie shape is toward the axis of rotation.

3. The hub motor of claim 2, wherein the two or more permanent magnets and the two or more coils are disposed such that a line comprising a side of the pie shape substantially intersects the axis of rotation.

4. The hub motor of claim 1, wherein the permanent magnets are positioned such that a distance between two adjacent permanent magnets in a rotor is about equal to a width of the cross-sectional shape of the two or more permanent magnets, the width measured at a widest portion of the cross-sectional shape.

5. The hub motor of claim 1, wherein the two or more rotors comprise a non-magnetic material.

6. The hub motor of claim 1, further comprising an energy recovery circuit in electrical communication with the two or more coils, the energy recovery circuit recovering energy from a collapsing magnetic field in response to the sequence controller disconnecting a coil.

7. The hub motor of claim 1, wherein a thin conductive shield surrounds the core.

8. The hub motor of claim 1, wherein the cross-sectional shape of the two or more permanent magnets is substantially circular and the two or more permanent magnets are substantially cylindrical.

9. An efficient hub motor system, the system comprising:
   a direct current source;
   one or more stators fixedly attached to a shaft;
   two or more rotors rotatably coupled to the shaft, wherein each stator is sandwiched between two rotors;
   two or more coils embedded in each stator in a circular pattern, wherein a row of coils are each positioned a same radius from the center of a stator, wherein each coil in the row is of a uniform size with a non-conductive, non-magnetic core wherein a conductor is wound around the core;
   two or more permanent magnets embedded in each rotor, each permanent magnet having a similar cross-sectional shape as a core with an end of each of the permanent magnets positioned toward a stator, the permanent magnets positioned in a circular pattern with a radius substantially similar to the radius of the coils;

two or more shorting bars comprising a conductive material, each connecting an exterior edge of two or more permanent magnets, the exterior edge not facing a stator;

a sequence control that connects each coil to the direct current source such that current flows in a coil in one direction and the sequence control disconnects the coil and reconnects the coil with current flowing in the opposite direction in response to a set of permanent magnets aligning with a predefined position relative to the coil; and an energy recovery circuit in electrical communication with the two or more coils, the energy recovery circuit recovering energy from a collapsing magnetic field in response to the sequence controller disconnecting a coil;

wherein the energy recovery circuit comprises two or more capacitors, each capacitor corresponding to a group of coils that are connected and disconnected concurrently by the sequence control, each capacitor storing the energy recovered from the corresponding group of coils.

10. The system of claim 9, wherein the sequence control adjusts the predefined position relative to the coil in response to a rotational speed of the two or more rotors.

11. The system of claim 9, wherein the sequence control is configured to turn on and shut off individual coils in response to external demands on the hub motor.

12. An efficient hub motor, the motor comprising:

one or more stators fixedly attached to a shaft, each stator comprising a non-magnetic, non-conductive material;

two or more coils embedded in each stator in a circular pattern, wherein a row of coils are each positioned a same radius from the center of a stator, wherein each coil in the row is of a uniform size with a non-conductive, non-magnetic core wherein a conductor is wound around the core;

two or more rotors rotatably coupled to the shaft such that the shaft defines an axis of rotation of the two or more rotors, the two or more rotors comprising a non-magnetic material, wherein each stator is sandwiched between two rotors;

two or more permanent magnets embedded in each rotor, each permanent magnet having a similar cross-sectional shape as a core with an end of each of the permanent magnets positioned toward a stator, the cross-sectional shape comprising a pie shape, the permanent magnets positioned in a circular pattern with a radius substantially similar to the radius of the coils, the permanent magnets positioned such that when a coil aligns with a permanent magnet a next coil aligns between two magnets;

two or more shorting bars comprising a conductive material, each shorting bar connecting an exterior edge of two or more permanent magnets, the exterior edge not facing a stator; and a sequence control that connects each coil such that current flows in a coil in one direction and the sequence control disconnects the coil and reconnects the coil with current flowing in the opposite direction in response to a set of permanent magnets aligning directly with the coil;

wherein a length of the two or more permanent magnets measured parallel to the axis of rotation is longer than a distance between two adjacent permanent magnets in the two or more rotors or is at least as long as a distance between two rotors.

13. The hub motor of claim 12, wherein the permanent magnets are positioned such that a distance between two adjacent permanent magnets in one of the two or more rotor is about equal to a width of the cross-sectional shape of the two or more permanent magnets, the width measured at a widest portion of the cross-sectional shape.

* * * * *